United States Patent
Drake

(10) Patent No.: US 10,527,119 B2
(45) Date of Patent: *Jan. 7, 2020

(54) VEHICLE BRAKING SYSTEMS WITH AUTOMATIC SLACK ADJUSTERS

(71) Applicant: TSE Brakes, Inc., Cullman, AL (US)

(72) Inventor: Will Brandon Drake, Cullman, AL (US)

(73) Assignee: TSE Brakes, Inc., Cullman, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/250,465

(22) Filed: Jan. 17, 2019

(65) Prior Publication Data

US 2019/0145476 A1 May 16, 2019

Related U.S. Application Data

(63) Continuation of application No. 15/668,328, filed on Aug. 3, 2017, now Pat. No. 10,197,123.

(Continued)

(51) Int. Cl.
 *B60T 17/22* (2006.01)
 *F16D 65/60* (2006.01)
(Continued)

(52) U.S. Cl.
 CPC .............. *F16D 65/60* (2013.01); *B60T 7/108* (2013.01); *B60T 13/36* (2013.01); *F16D 51/24* (2013.01); *F16D 65/28* (2013.01); *F16D 2066/003* (2013.01); *F16D 2125/24* (2013.01); *F16D 2125/28* (2013.01); *F16D 2125/30* (2013.01)

(58) Field of Classification Search
 CPC ........... F61D 65/60; B60T 7/108; B60T 13/36
 USPC .... 188/79.51–79.55, 196 BA, 196 D, 196 V, 188/1.11 E, 1.11 L, 72.9; 340/453, 454; 116/208
 See application file for complete search history.

(56) References Cited

U.S. PATENT DOCUMENTS

| 3,351,163 A | 11/1967 | Sander et al. |
| 4,380,276 A * | 4/1983 | Sweet ..................... F16D 65/60 188/196 BA |

(Continued)

OTHER PUBLICATIONS

International Preliminary Report on Patentability, PCT/US2017/045431, dated Feb. 14, 2019.

(Continued)

*Primary Examiner* — Christopher P Schwartz
(74) *Attorney, Agent, or Firm* — Andrus Intellectual Property Law, LLP

(57) ABSTRACT

A vehicle braking system includes a piston rod extendable from an air brake chamber, a rotatable cam shaft, and a slack adjuster coupled to the piston rod and the cam shaft. The slack adjuster is configured to rotate the cam shaft as the piston rod extends. The slack adjuster has a control gear coupled to the cam shaft such that the control gear rotates as the cam shaft is rotated. A pinion gear meshes with the control gear such that the pinion gear rotates as the control gear rotates, and a take-off gear meshes with the pinion gear such that the take-off gear rotates as the control gear rotates. A magnet coupled to the take-off gear is configured to rotate as the take-off gear rotates. A sensor is configured to sense rotation of the magnet, and an indicator is configured to indicate brake stroke of the piston rod.

11 Claims, 9 Drawing Sheets

Related U.S. Application Data

(60) Provisional application No. 62/370,772, filed on Aug. 4, 2016.

(51) Int. Cl.
*B60T 7/10* (2006.01)
*B60T 13/36* (2006.01)
*F16D 51/24* (2006.01)
*F16D 65/28* (2006.01)
F16D 125/24 (2012.01)
F16D 125/28 (2012.01)
F16D 66/00 (2006.01)
F16D 125/30 (2012.01)

(56) References Cited

U.S. PATENT DOCUMENTS

| | | | |
|---|---|---|---|
| 4,776,438 A | 10/1988 | Schandelmeier | |
| 5,207,299 A | 5/1993 | Feldmann | |
| 5,213,056 A | 5/1993 | Nicholls et al. | |
| 5,253,735 A | 10/1993 | Larson et al. | |
| 5,263,556 A | 11/1993 | Frania | |
| 5,699,880 A | 12/1997 | Hockley | |
| 5,762,165 A * | 6/1998 | Crewson | F16D 65/60 188/1.11 W |
| 6,119,822 A * | 9/2000 | Baldwin | F16D 51/22 188/325 |
| 6,314,861 B1 | 11/2001 | Smith et al. | |
| 7,198,138 B2 | 4/2007 | Chadha et al. | |
| 7,373,224 B2 | 5/2008 | Goetz et al. | |
| 7,624,849 B2 | 12/2009 | Goncalves et al. | |
| 8,245,820 B2 | 8/2012 | Echambadi et al. | |
| 8,302,742 B2 * | 11/2012 | Louis | B60T 7/108 188/72.9 |
| 8,302,744 B2 * | 11/2012 | Louis | F16D 65/60 188/196 B |
| 8,672,101 B2 * | 3/2014 | Louis | B60T 7/108 188/79.55 |
| 9,267,562 B2 | 2/2016 | Gaufin et al. | |
| 9,447,832 B2 * | 9/2016 | Todd | B60T 17/088 |
| 10,197,123 B2 * | 2/2019 | Drake | F16D 65/60 |
| 2012/0031716 A1 | 2/2012 | Flodin | |
| 2016/0010711 A1 | 1/2016 | Root et al. | |

OTHER PUBLICATIONS

International Search Report and Written Opinion, PCT/US2017/045431, dated Oct. 31, 2017.

* cited by examiner

VEHICLE BRAKING SYSTEMS WITH AUTOMATIC SLACK ADJUSTERS

CROSS-REFERENCE TO RELATED APPLICATION

The present application is a continuation application of U.S. patent application Ser. No. 15/668,328, filed Aug. 3, 2017, which claims the benefit of U.S. Provisional Patent Application No. 62/370,772, filed Aug. 4, 2016, both of which applications are hereby incorporated by reference in their entirety.

FIELD

The present disclosure relates to automatic slack adjusters for vehicle braking systems.

BACKGROUND

The following are hereby incorporated herein by reference, in entirety.

U.S. Pat. No. 4,776,438 discloses a brake adjustment indicator adapted to be mounted to a mounting bracket which supports a brake air chamber on a surface of the mounting bracket opposite the brake air chamber with the brake air chamber having a rod extending there through with one end of the rod adjacent the surface and connected by a clevis pin to a brake arm.

U.S. Pat. No. 5,699,880 discloses a brake adjustment indicator for a braking system including a pressure chamber, a pushrod extending longitudinally outwards from the pressure chamber and moveable when correctly adjusted between first and second positions, a brake arm and a pivot for pivotally mounting the pushrod to the brake arm.

U.S. Pat. No. 5,762,165 discloses indicia applied to opposite side surfaces of a housing of a slack adjuster for vehicle brakes and a pointer is fixed for movement with a connector serving to pivotally connect the housing to a brake operating rod; the pointer cooperating with the indicia to provide visual indication of when the brake operating rod is in a retracted brake release position and when movement of such operating rod away from the brake release position exceeds a desired limit of brake operating movement.

U.S. Pat. No. 6,314,861 discloses a diaphragm-based spring brake actuator assembly which allows for the delivery of more force to the push rod without increasing the size of the actuator unit.

U.S. Pat. No. 8,302,742 discloses an improved self-adjusting automatic slack adjuster for reducing slack in the brake of a vehicle, in which a one-way clutch assembly is arranged in the housing of the automatic slack adjuster housing such that a thin-wall region of the housing associated with the gear drive of the one-way clutch assembly is located outside of a load path through which brake applications forces are conveyed from a brake actuator to a brake cam shaft upon which the automatic slack adjuster is located.

U.S. Pat. No. 8,302,744 discloses an improved automatic slack adjuster for reducing slack in the brake of a vehicle, in which a one-way clutch assembly is arranged at a side of the automatic slack adjuster housing, and one-way motion-inhibiting pawls in the one-way clutch assembly act on one-way gear teeth disposed on an inner radius of a gear wheel within the assembly whose outer circumference drives a slack adjuster unit.

U.S. Pat. No. 8,672,101 discloses an improved self-adjusting automatic slack adjuster for reducing slack in the brake of a vehicle, in which an easily accessible external operating feature permits the automatic slack adjuster's one-way clutch assembly to be readily disengaged to allow smooth release and retraction of the brake shoes of a vehicle brake without damage to the one-way teeth of the clutch assembly.

U.S. Pat. No. 9,267,562 discloses a brake chamber stroke indicator system for a brake system including a brake air chamber includes an indicator rod or a string pot gauge including a housing with an indicator rotatably positioned within the housing.

U.S. Pat. No. 9,447,832 discloses a vehicle brake monitoring system comprises at least one sensor for detecting relative rotational position of a brake camshaft during vehicle braking.

BRIEF DESCRIPTION OF THE DRAWINGS

The present disclosure includes the following drawing figures.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In certain examples, a vehicle braking system includes a piston rod extendable from an air brake chamber, a rotatable cam shaft, and a slack adjuster coupled to the piston rod and the cam shaft. The slack adjuster is configured to rotate the cam shaft as the piston rod extends. The slack adjuster has a control gear coupled to the cam shaft such that the control gear rotates as the cam shaft is rotated, a pinion gear that meshes with the control gear such that the pinion gear rotates as the control gear rotates, a take-off gear that meshes with the pinion gear such that the take-off gear rotates as the control gear rotates, and a magnet coupled to the take-off gear and configured to rotate as the take-off gear rotates. A sensor is configured to sense rotation of the magnet, and an indicator is configured to indicate brake stroke of the piston rod.

In certain examples, a vehicle braking system includes an piston rod extendable from an air brake chamber, a rotatable cam shaft, and a slack adjuster coupled to the piston rod and the cam shaft. The slack adjuster is configured to rotate the cam shaft as the piston rod extends. The slack adjuster has a control gear coupled to the cam shaft such that the control gear rotates as the cam shaft is rotated, a pinion gear that meshes with the control gear such that the pinion gear rotates as the control gear rotates, and a magnet coupled to the pinion gear and configured to rotate as the pinion gear rotates. A sensor is configured to sense rotation of the magnet, and an indicator is configured to indicate brake stroke of the piston rod.

DETAILED DESCRIPTION

In the present disclosure, certain terms have been used for brevity, clarity and understanding. No unnecessary limitations are to be inferred therefrom beyond the requirement of the prior art because such terms are used for descriptive purposes only and are intended to be broadly construed. The apparatuses, methods, and systems disclosed herein may be used alone or in combination with other apparatuses, methods, and systems. Various equivalents, alternatives, and modifications are possible and are contemplated and included with respect to the examples disclosed herein.

Figure 1:
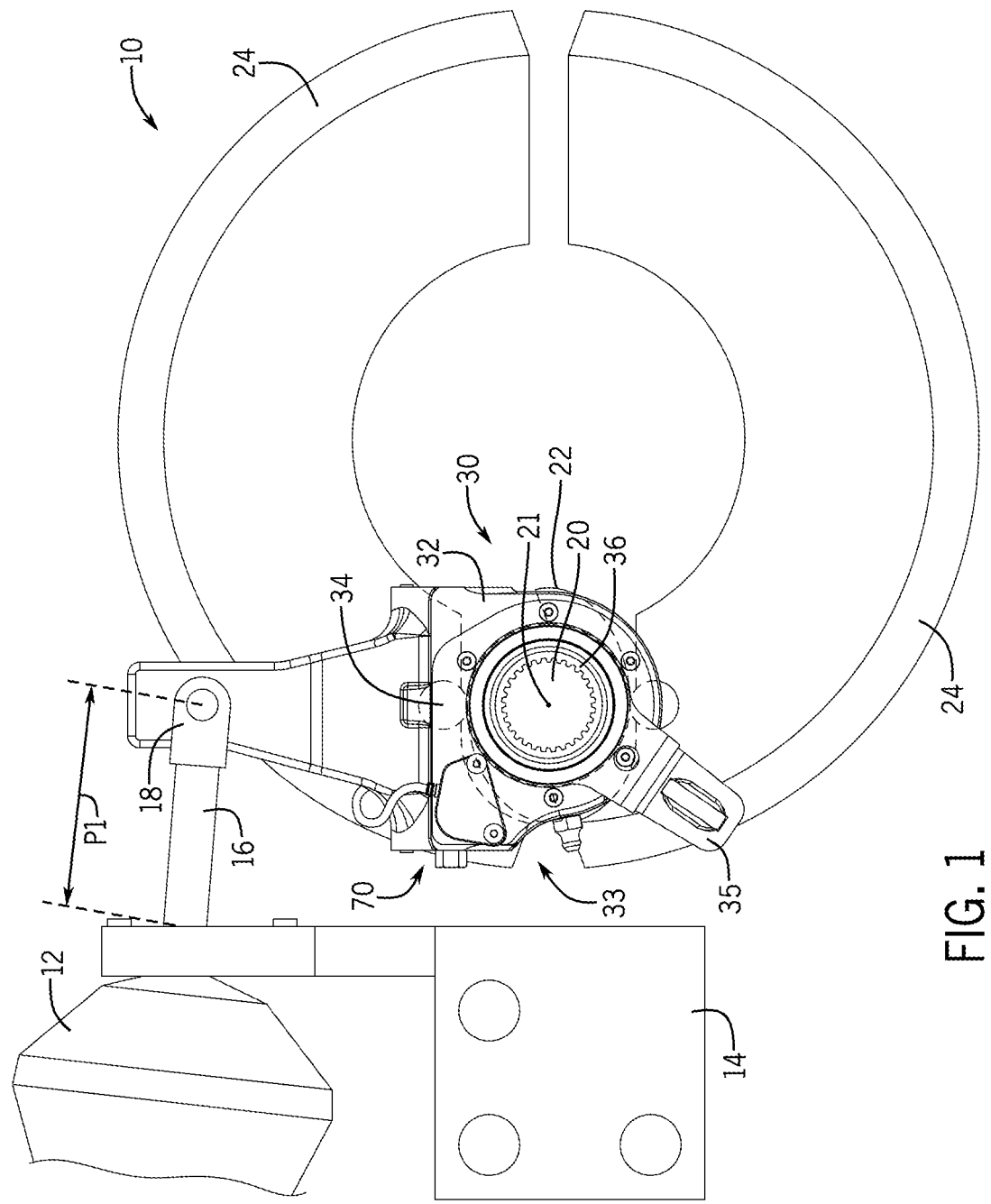
FIG. 1 depicts a side view of an example slack adjuster according to the present disclosure connected to a braking system (a partial portion of the braking system is depicted in FIG. 1). A piston rod of the braking system is in a retracted position and the automatic slack adjuster is in a rest position.
Figure 2:
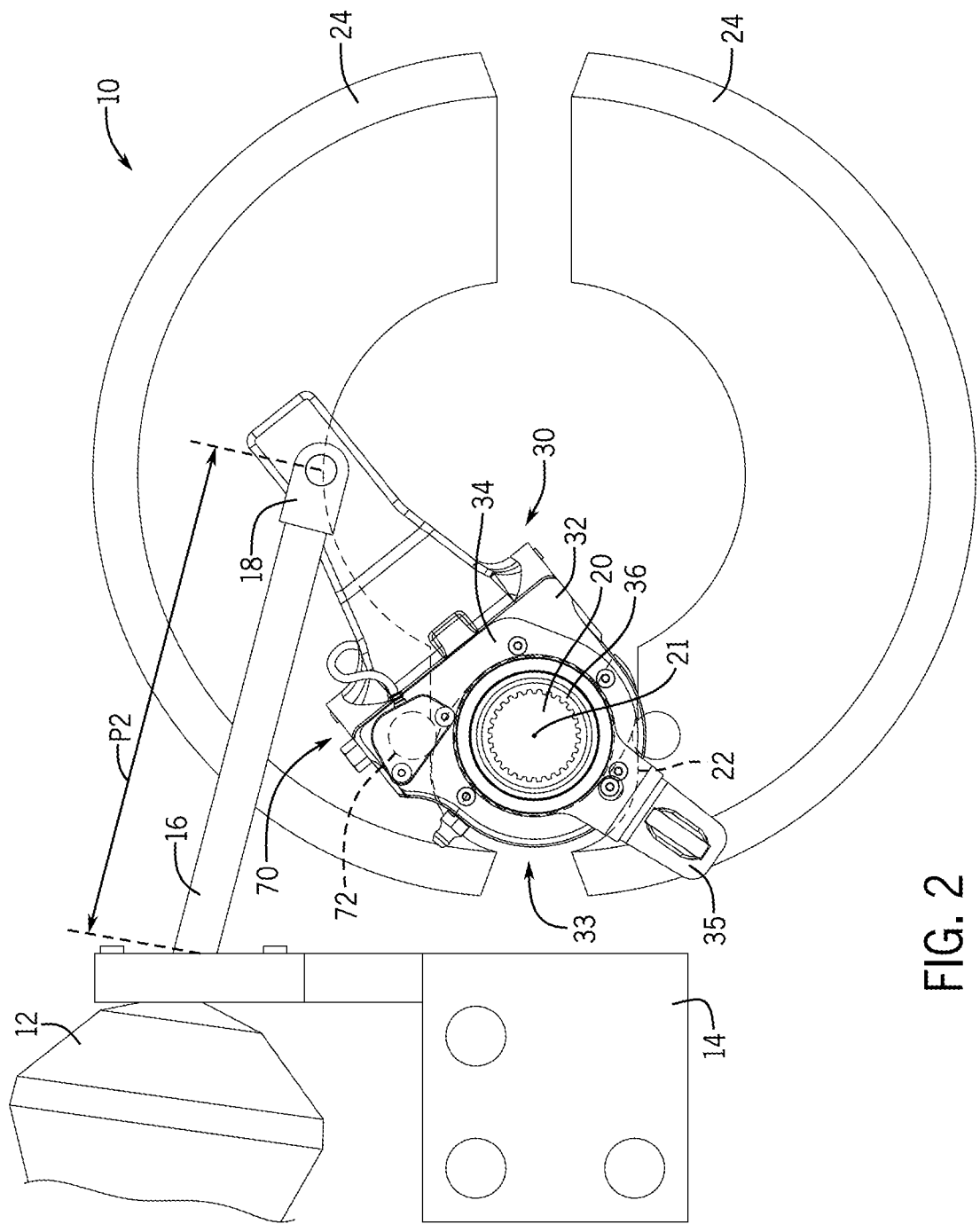
FIG. 2 is a view like FIG. 1 in which the piston rod is in an extended position and the automatic slack adjuster is in a braking position.
Figure 3:
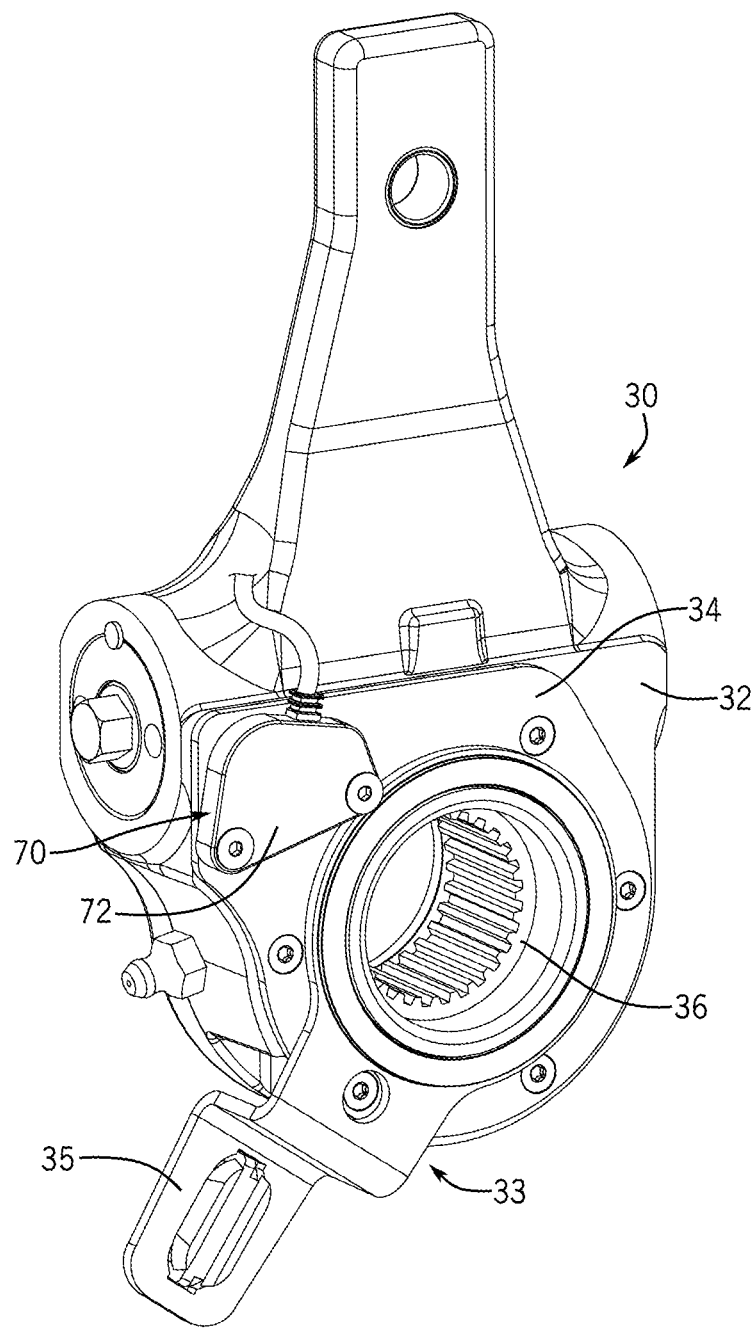
FIG. 3 is a perspective view of an example slack adjuster of the present disclosure.
Figure 4:
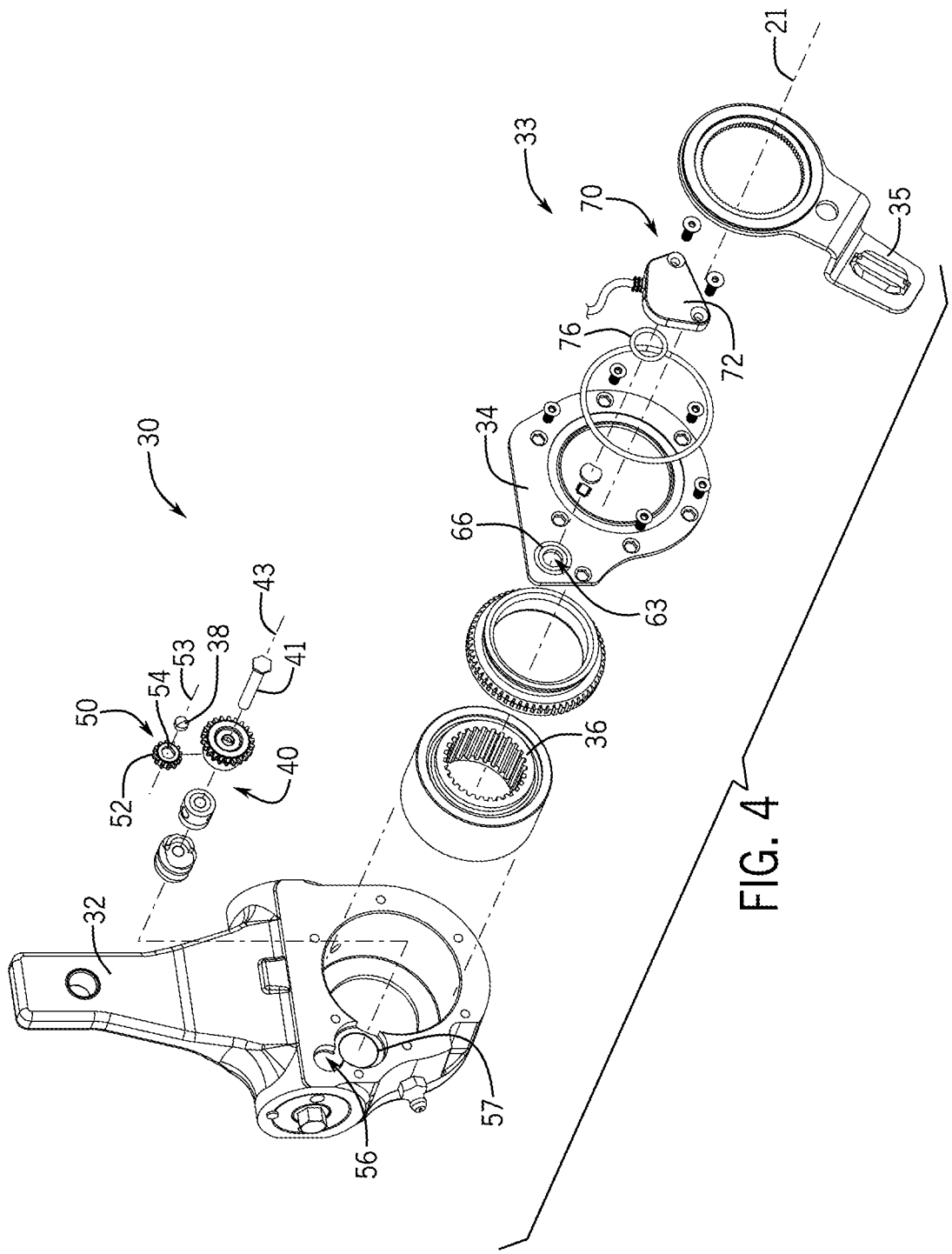
FIG. 4 is an exploded view of the slack adjuster of FIG. 3.
Figure 5:
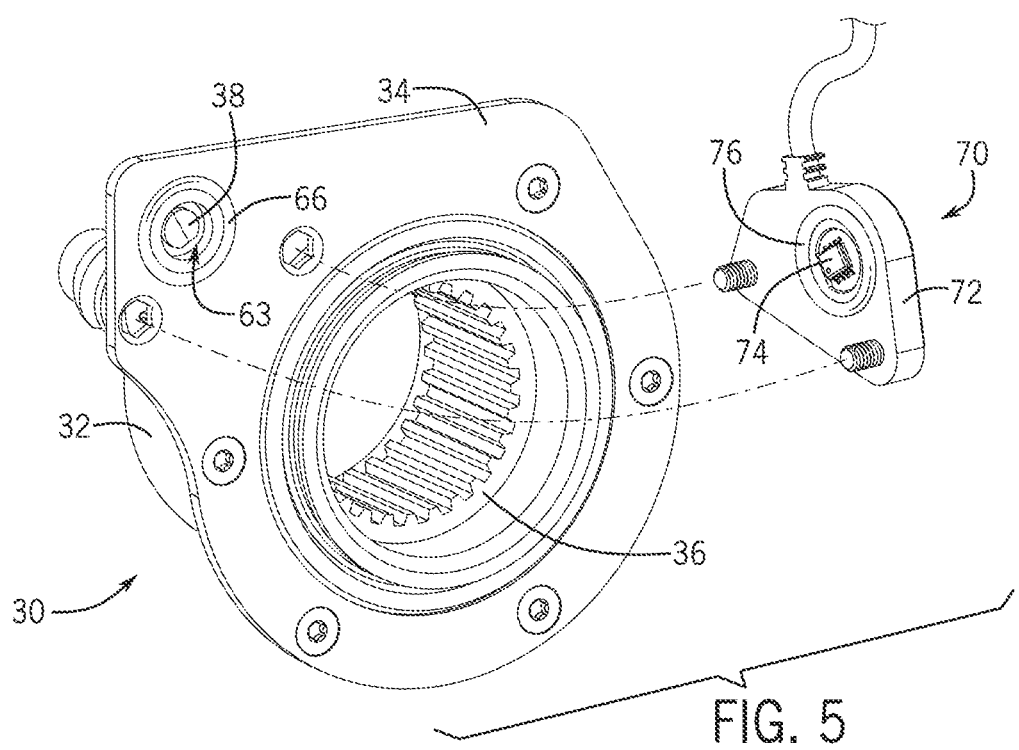
FIG. 5 is an enlarged, partial view of the slack adjuster of FIG. 3 with a sensor assembly disconnected from a cover plate.

FIGS. 1-2 depict a partial view of an example vehicle braking system 10 having an slack adjuster 30 of the present disclosure. The braking system 10 is configured to slow or stop a vehicle. The braking system 10 includes an air brake chamber 12 which is mounted to the frame 14 of the vehicle. A pushrod or piston rod 16 is extendable from the air brake chamber 12 and is coupled to the slack adjuster 30 by a clevis 18. The slack adjuster 30 is coupled to a cam shaft 20 that extends along a cam shaft axis 21 and has a S-cam 22 (depicted in dashed lines) configured to move brake shoes 24 into frictional engagement with a brake drum (not shown). When the brake of the braking system 10 is depressed by the operator, the air brake chamber 12 is pressurized such that the piston rod 16 is moved to an extended position (FIG. 2). Movement of the piston rod 16 to the extended position causes the slack adjuster 30 to rotate to a braking position and rotate the cam shaft 20 which causes the S-cam 22 to move the brake shoes 24 into frictional engagement with the brake drum to thereby slow or stop the vehicle. When the brake of the braking system 10 is released, the piston rod 16 retracts to a retracted position (FIG. 1), the slack adjuster 30 returns to a rest position, and the cam shaft 20 rotates such that the S-cam 22 does not engage the braking shoes 24. The brake shoes 24 also retract a predetermined distance or clearance from the brake drum. However, as the vehicle is operated and the brake shoes 24 become worn, the slack adjuster 30, the cam shaft 20, and the S-cam 22 are required to rotate through a greater angle to apply the brakes. As such the slack adjuster 30 automatically changes the angular position between the slack adjuster 30 and the cam shaft 20 to reduce the shoe-to-drum clearance to a desired level (i.e. a prescribed running clearance). Reference is made to the above incorporated patents for more description of the operation of the braking system and conventional slack adjusters.

Conventional manual slack adjusters must be routinely serviced and manually reset in order to maintain proper clearance between the brake shoes 24 and the brake drums. Conventional automatic slack adjusters are typically designed with a preset running clearance and a ratcheting mechanism that automatically takes up excess movement caused by worn components. Conventional automatic slack adjusters are available from Webb Brake Adjusters (Part No. WBA07135S) and Haldex (Part No. 40020212). The Commercial Vehicle Safety Alliance (CVSA) regulates in-service inspection criteria for commercial vehicles operating in the US, Canada, and Mexico. Improper brake adjustment accounted for 18% of out-of-service (OOS) citations issued from 2012 through 2014 (CVSA, Roadcheck 2014). Each OOS citation may result in immediate downtime for the vehicle, repair expenses, and thus loss of revenue.

Conventional mechanical or electronic systems can be implemented on the vehicle to measure brake adjustment and/or brake stroke of the piston rod. Mechanical systems are typically "eyes-on", meaning that the operator must get out of the cab and physically inspect each wheel end for proper adjustment (e.g., see the mechanical systems disclosed in U.S. Pat. Nos. 4,776,438, 5,699,880, and 5,762,165, which are hereby incorporated by reference, in entirety). An advantage of these systems lies in reducing the amount of time required to perform the inspection; however, they typically require two people (one in addition to the driver) to perform the inspection, offer only a partial reduction in the amount of inspection time required, and are often susceptible to interference from external sources. Electronic systems vary in methodology and precision (e.g., see the electronic systems disclosed in U.S. Pat. Nos. 7,373,224, 7,624,849, and 9,447,832, which are hereby incorporated herein by reference, in entirety). Certain electronic systems provide only a "green light" indication of in-service or out-of-service status, while other electronic systems report the actual brake stroke measurement. A drawback of these systems has traditionally been the high upfront cost.

Through research and experimentation, the present inventor has recognized that it is desirable to improve upon prior art systems that sense and/or measure brake adjustment and/or brake stroke of the piston rod. Thus, the present inventor has endeavored to develop improved systems and methods for efficiently and effectively monitoring and measuring brake adjustment and/or brake stroke of the piston rod and for providing automatic feedback to the operator. Accordingly, the apparatuses, methods, and systems of the present disclosure require fewer parts to measure brake stroke; reduce installation costs and assembly time when compared to conventional systems that measure brake stroke; minimize interference with other components of the brake system when compared to conventional systems that measure brake stroke; and eliminate or reduce alignment procedures when installing the slack adjuster when compared to conventional systems that measure brake stroke.

FIGS. 3-6 depict an example automatic slack adjuster 30 having a body 32 and a control arm assembly 33 that sets a reference point for automatic brake adjustment. The control arm assembly 33 includes a cover plate 34 that covers the internal components of the slack adjuster 30 (described herein). The cover plate 34 includes a cutout 63 (FIG. 4) that is axially above a magnet 38 (described herein). The cutout 63 can be any suitable shape, and in certain examples, the shape of the cutout 63 corresponds to the shape of the magnet 38. The cover plate 34 also includes a groove 66 configured to receive a sealing gasket or O-ring 76 (described herein). A control arm 35 fixedly couples the control arm assembly 33 to the vehicle (e.g. the frame 14 of the vehicle).

The slack adjuster 30 includes several internal components, some of which are detailed and described herein below. Reference is also made to the above incorporated U.S. Patents for further detail and description of internal components of manual and automatic slack adjusters. A control gear 36 is coupled to the cam shaft 20, and a pinion assembly 40 meshes or engages with the control gear 36 such that the pinion assembly 40, or a component thereof, rotates as the control gear 36 rotates. The pinion assembly 40 has a pinion axle 41, a pinion axis 43, and a pinion gear 42 centered about the pinion axis 43. A take-off assembly 50 meshes or engages with the pinion assembly 40 such that the take-off assembly 50, or a component thereof, rotates as the pinion assembly 40 and the control gear 36 rotates. The take-off assembly 50 includes a take-off axis 53 and a take-off gear 52 centered about the take-off axis 53. The take-off assembly 50 is positioned or recessed in a pocket 56 (FIG. 4) defined in the body 32. In certain examples, the pocket 56 is in communication with a void or bore 57 in which the pinion assembly 40 is received. In certain examples, the take-off gear 52 is smaller than the pinion gear 42 (i.e. the radius R1 of the take-off gear 52 is less than the radius R2 of the pinion gear 42 (see FIG. 6)).

Figure 6:
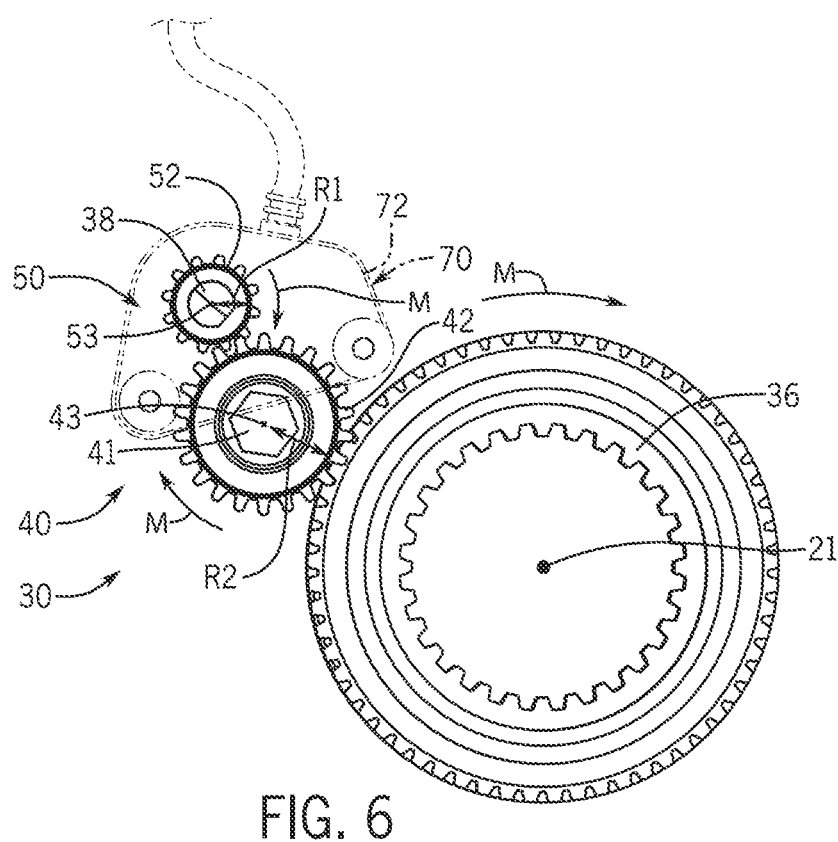
FIG. 6 is a side view of internal components of the slack adjuster of FIG. 3. In particular, a control gear, a pinion gear, and a take-off gear are depicted. The sensor assembly is depicted in dashed lines.
Figure 7:
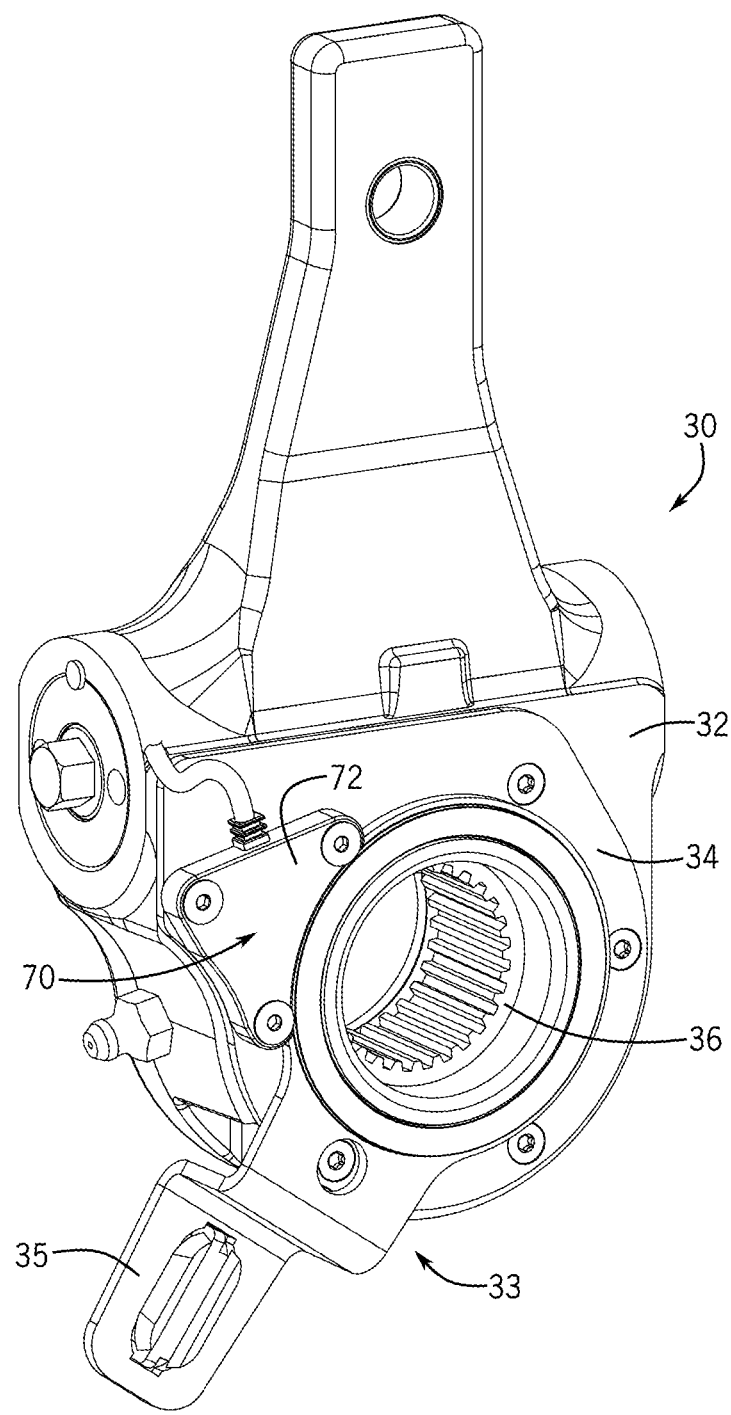
FIG. 7 is a perspective view of another example slack adjuster of the present disclosure.
Figure 8:
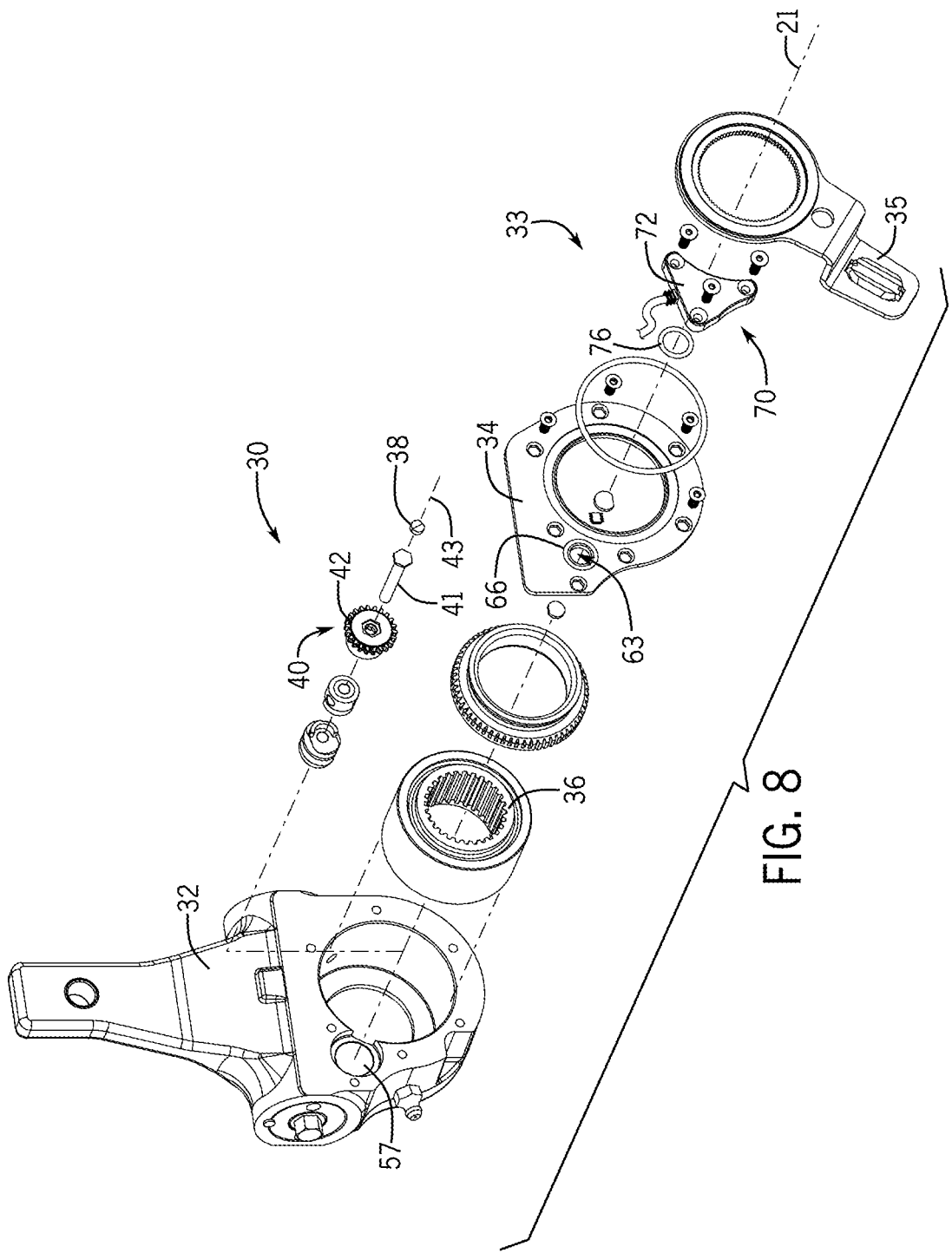
FIG. 8 is an exploded view of the slack adjuster of FIG. 7.
Figure 9:
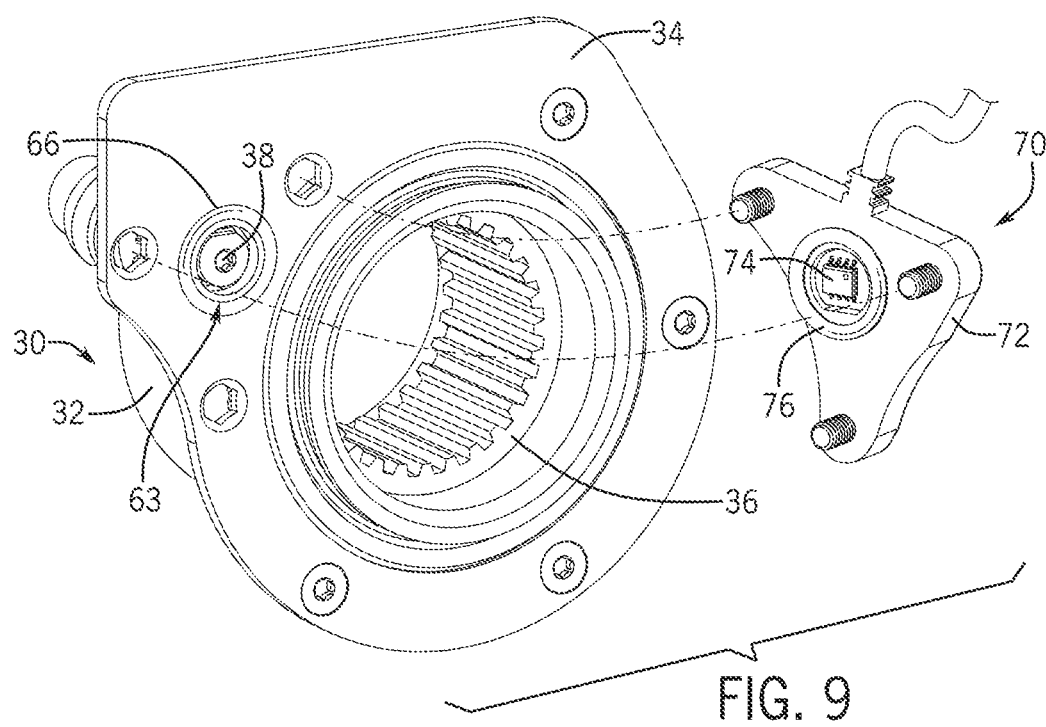
FIG. 9 is an enlarged, partial view of the slack adjuster of FIG. 7 with the sensor assembly disconnected from the cover plate.

The present inventor has determined that in certain slack adjusters 30, the inclusion of the take-off assembly 50 is important to correctly sense the rotation of a magnet 38 (described herein) attached thereto. That is, the present inventor has recognized that pinion assemblies in certain slack adjusters may not be susceptible for coupling the magnet 38 thereto (e.g. the pinion axle may rotate independently from the pinion gear; the pinion axle and/or pinion gear may not be conducive to coupling the magnet 38 thereto). Accordingly, the present inventor has discovered through research and experimentation that the inclusion of the take-off assembly 50 can provide a location to couple a magnet 38 to the slack adjuster 30. In these example slack adjusters 30, a magnet 38 is coupled the take-off assembly 50 such that the magnet 38 rotates as the take-off assembly 50 rotates. That is, as the slack adjuster 30 and cam shaft 20 rotate (FIGS. 1-2), the control gear 36 rotates the pinion gear 42 which in turn rotates the take-off gear 52 and the magnet 38 (the motion arrows in FIG. 6 depict rotation of the control gear 36, pinion assembly 40, and the take-off assembly 50, note that opposite rotation is possible). The control gear 36, the pinion gear 42, the take-off gear 52, and the magnet 38 rotate continuously regardless of whether or not automatic brake adjustment is being performed by the slack adjuster 30. The magnet 38 is positioned relative to or centered on the take-off axis 53 such that the magnet 38 rotates about the take-off axis 53. The take-off axis 53, the pinion axis 43, and the cam shaft axis 21 are parallel to each other.

The magnet 38 is coupled to the take-off assembly 50, or component thereof, by any suitable fastener (e.g. screw, adhesive). In certain examples, the take-off gear 52 defines a cutout 54 (FIG. 4) in which the take-off gear 52 and/or the magnet 38 is partially or completely recessed. The shape of the cutout 54 can vary (e.g. circular, disc shaped, "D"-shaped) and in certain examples, the shape of the cutout 54 corresponds to the shape of the magnet 38. The magnet 38 can also be integral with the take-off gear 52. The magnet 38 can be a multi-pole magnet, and the size and shape of the magnet 38 can vary (e.g. the magnet 38 is a diametrically magnetized disc magnet).

Figure 10:
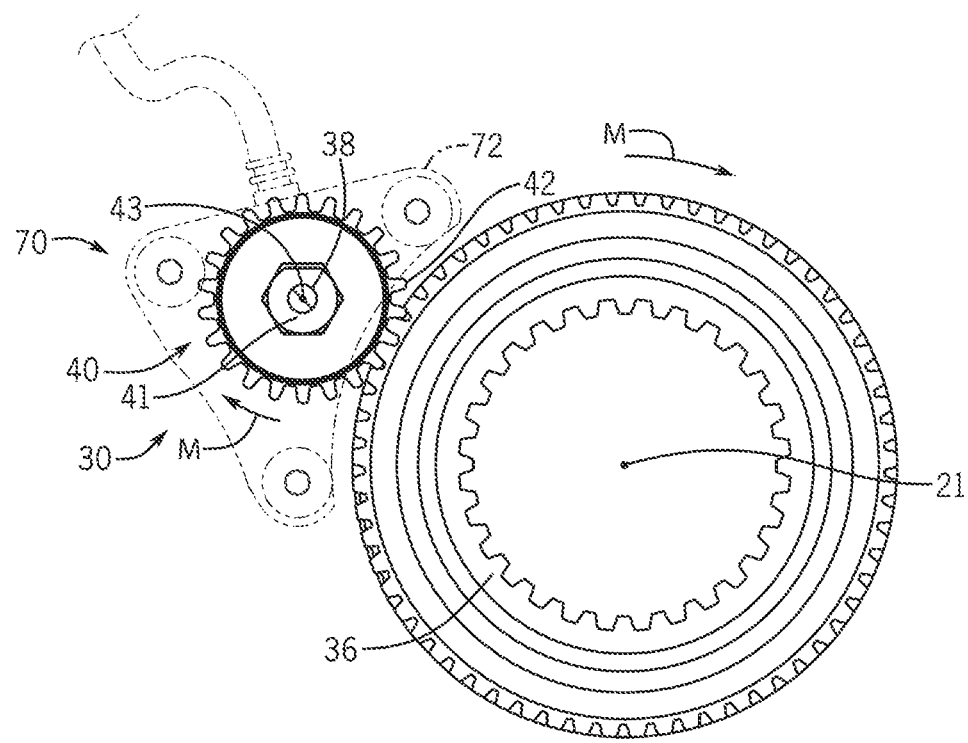
FIG. 10 is a side view of internal components of the slack adjuster of FIG. 7. In particular, the control gear and the pinion gear are depicted. The sensor assembly is depicted in dashed lines.

Referring now to FIGS. 7-10 another example automatic slack adjuster 30 is depicted. In this example, the magnet 38 is coupled to the pinion assembly 40 and there is no take-off assembly 50. The magnet 38 is coupled to the pinion assembly 40 such that the magnet 38 rotates as the pinion assembly 40 rotates. That is, as the slack adjuster 30 and cam shaft 20 rotate (FIGS. 1-2), the control gear 36 rotates the pinion gear 42 which in turn rotates the magnet 38 (motion arrows M in FIG. 10 depict rotation of the control gear 36 and pinion assembly 40, note that opposite rotation is possible).

Both example slack adjusters 30 (the first example depicted in FIGS. 3-6 and the second example depicted in FIGS. 7-10) includes a sensor assembly 70 having a sensor housing 72 that is coupled to cover plate 34 and a sensor 74 configured to sense rotation of the magnet 38. That is, the sensor 74 is configured to continuously sense rotation of the magnet 38 and send signals to a computer controller 100 (described further herein) corresponding to the sensed rotation of the magnet 38. The sensor 74 is positioned axially along the pinion axis 43 or the take-off axis 53 such that the cutout 63 (FIG. 4) provides a clear path between the sensor 74 and the magnet 38. An O-ring 76 is sandwiched between the cover plate 34 and the sensor housing 72 and received in the groove 66 to thereby form a fluid-tight seal between the sensor housing 72 and the cover plate 34. In alternate examples, the groove 66 can be omitted and a flat seal (not shown) can be sandwiched between the sensor 74 and the cover plate 34 to create the fluid-tight seal. Any suitable sensor 74 that can sense rotation of a magnet can be used. Examples of suitable sensors are commercially available from Infineon (model Nos. TLE5009 and TLE5012B), AMS (model No. AS5132), and Avago (model No. AEAT-6600-T16).

Figure 11:
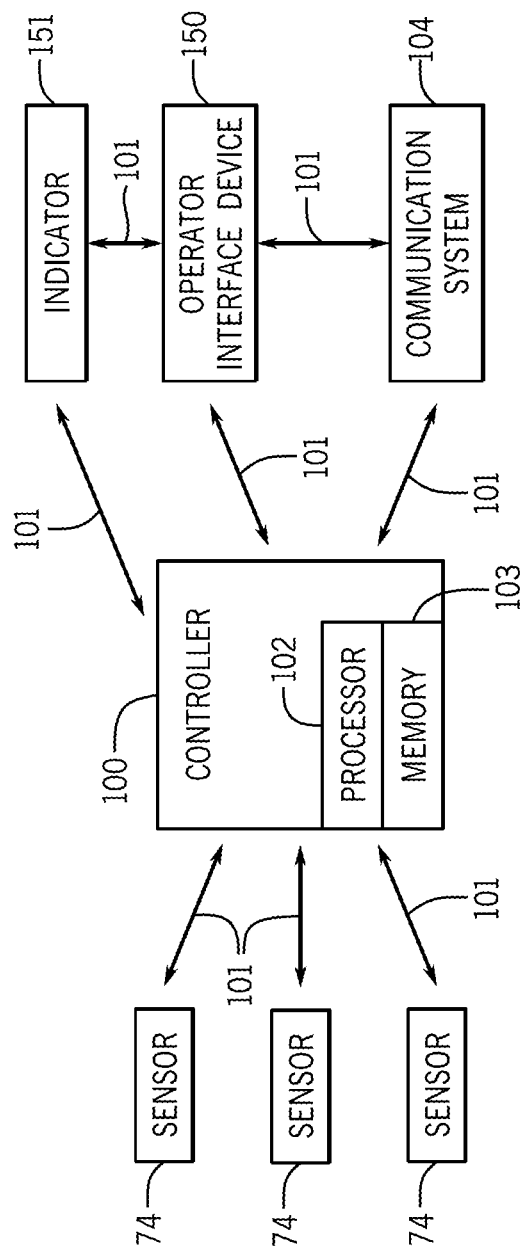
FIG. 11 is an example system diagram.

Referring to FIG. 11, a controller 100 receives signals from the sensor(s) 74. The controller 100 can be located on the slack adjuster 30 and/or can be located remotely from the slack adjuster 30. In some examples, the controller 100 can be configured to communicate via wired communication (such as the CAN bus), wireless communication (e.g. Bluetooth or BLE), or any other suitable communication system 104. Although FIG. 11 shows one controller 100, there can be more than one controller 100. Portions of the methods described herein can be carried out by a single controller or by several separate controllers. Each controller can have one or more control sections or control units. The controller 100 can include a computing system that includes a processing system, storage system, software, and input/output (I/O) interfaces (e.g. operator interface device 150 having an indicator 151) for communicating with devices described herein and/or with other devices. The processing system can load and execute software from the storage system. The controller 100 may include one or many application modules and one or more processors 102, which may be communicatively connected. The processing system may comprise a microprocessor and other circuitry that retrieves and executes software from the storage system. Non-limiting examples of the processing system include general purpose central processing units, applications specific processors, and logic devices. The storage system can comprise any storage media readable by the processing system and capable of storing software. The storage system can include volatile and non-volatile, removable and non-removable media implemented in any method or technology for storage of information, such as computer readable instructions, data structures, program modules, or other data. The storage system can be implemented as a single storage device or across multiple storage devices or sub-systems.

The controller 100 communicates with one or more components of the slack adjuster 30 via one or more communication links 101, which can be wired or wireless links. The controller 100 is capable of monitoring and/or controlling one or more operational characteristics of the sensor(s) 74 and/or the operator interface device 150 and its various subsystems by sending and receiving control signals via the communication links 101. It should be noted that the extent of connections of the communication link 61 shown herein is for schematic purposes only.

The controller 100 is coupled to an operator interface device 150 having an indicator 151. The operator interface device 150 can be located on the slack adjuster 30 and/or can be located remotely from the slack adjuster 30 (e.g. in the cab of the vehicle). The type and configuration of the operator interface device 150 can vary from that which is shown. The operator interface device 150 can include one or more conventional interface devices for interfacing and/or inputting operator selections to the controller 100. Exemplary operator interface devices 150 include touch screens, mechanical buttons, mechanical switches, voice command receivers, tactile command receivers, gesture sensing devices, and/or remove controllers such as personal digital assistant(s) (PDAs), handheld(s), laptop computer(s), and/or the like.

As described above, the controller 100 receives signals from the sensor 74 that correspond to the relative rotation between the magnet 38 and the body 32. The controller 100 is configured (programmed) to calculate the brake stroke of the piston rod 16 based on the signal received from the sensor 74 (length P1 on FIG. 1 depicts the length of the piston rod 16 when the piston rod 16 is in the retracted position and length P2 on FIG. 2 depicts the length of the piston rod 16 when the piston rod 16 is in the extended position; the brake stroke of the piston rod 16 is the difference between length P1 and length P2). The brake stroke of the piston rod 16 can be calculated in different ways. In one example, a memory 103 of the controller 100 has gear ratio values (e.g. gear ratio values for the control gear 36, the pinion gear 42, and/or the take-off gear 52) and a length of the control arm 35 stored thereon that are known or measured attributes of the particular slack adjuster 30 to which the sensor assembly 70 and/or sensor 74 is coupled (i.e. the gear ratio values and the length of the control arm 35 can differ between different models and sizes of slack adjusters 30). The processor 102 processes the signal from the sensor 74, the gear ratio values, and the length of the control arm 35 to calculate the brake stroke of the piston rod 16. The processor 62 can be configured to use formulas, software programs, and/or software modules stored on the memory 103 to calculate the brake stroke of the piston rod 16. In other examples, the gear ratio values and the length of the control arm 35 for a particular slack adjuster 30 being used can inputted into the controller 60 by the operator.

In other examples, the controller 60 is configured to compare the signal received from the sensor 74 to values in a lookup table stored on the memory 103 to determine the brake stroke of the piston rod 16. The lookup table includes preprogrammed values for the brake stroke of the piston rod 16 that correspond to the sensed rotation of the magnet. The processor 62 "looks-up" the signal received from the sensor 74 in the lookup table and selects the corresponding preprogrammed value for the brake stroke of the piston rod 16 (e.g. a signal from the sensor is 85 degrees of rotation which corresponds to 0.75 inches of brake stroke of the piston rod 16 based on the lookup table).

The controller 100 relays signals and/or information related to the calculated brake stroke of the piston rod 16 to the operator interface device 150. The operator interface device 150 visually depicts or indicates the brake stroke of the piston rod 16 (e.g. 0.95 inches of brake stroke, 1.65 inches of brake stroke). In alternative examples, the operator interface device 150 indicates whether the brake stroke of the piston rod 16 exceeds a maximum brake stroke value preselected and programmed into the system (e.g. a red light illuminates when the brake stroke value exceeds the maximum brake stroke value).

In certain examples, a vehicle braking system having a piston rod extendable from an air brake chamber and a rotatable cam shaft has a slack adjuster coupled to the piston rod and the cam shaft and being configured to rotate the cam shaft as the piston rod extends. The slack adjuster has a control gear coupled to the cam shaft such that the control gear rotates as the cam shaft is rotated; a pinion gear that meshes with the control gear such that the pinion gear rotates as the control gear rotates; a take-off gear the meshes with the pinion gear such that the take-off gear rotates as the control gear rotates; and a magnet coupled to the take-off gear and configured to rotate as the take-off gear rotates. A sensor is configured to sense rotation of the magnet, and an indicator is configured to indicate brake stroke of the piston rod. The cam shaft has a cam shaft axis and the take-off gear has a take-off axis that is parallel to the cam shaft axis and the magnet is coupled axially along the take-off axis. The pinion gear is centered about a pinion axis that is parallel cam shaft and the pinion axis is radially positioned apart from or between the cam shaft axis and the take-off axis. The slack adjuster defines a pocket in which the take-off gear is recessed, and the slack adjuster has a cover plate that is configured to cover the pinion gear, the take-off gear, and the magnet. The sensor is coupled to the cover plate such that the sensor is axially positioned relative to the magnet. The cover plate defines a cutout that is axially positioned relative to the take-off axis to thereby provide a clear path between the sensor and the magnet. The sensor has an O-ring, and the cover plate defines a groove that is configured to receive the O-ring so as to form a fluid tight seal between the cover plate and the sensor.

In certain examples, a controller is in communication with the sensor and configured to control the indicator to indicate the brake stroke of the piston rod. The controller can be configured to determine the brake stroke of the piston rod based on the rotation of the magnet sensed by the sensor. In certain examples, the controller has a memory that stores a length of the control arm and gear ratio values for the control gear, the pinion gear, and the take-off gear. The controller is configured to calculate the brake stroke of the piston rod based on the length of the control arm, the gear ratio values, and the rotation of the magnet sensed by the sensor. In certain examples, the memory stores a look-up table that has values that correlate rotation of the magnet sensed by the sensor to brake stroke of the piston rod. The controller is configured to compare the rotation of the magnet sensed by the sensor to the look-up table to thereby determine the brake stroke of the piston rod. In certain examples, the indicator is further configured to alert the operator when the brake stroke of the piston rod is equal to or greater than a maximum brake stroke value. The controller is also configured to control the indicator to alert the operator that the brake stroke of the piston rod is equal to or greater than the maximum brake stroke value stored on the memory based on the brake stroke of the piston rod determined by the controller.

In certain examples, a vehicle braking system having a piston rod extendable from an air brake chamber and a rotatable cam shaft includes a slack adjuster coupled to the piston rod and the cam shaft and being configured to rotate the cam shaft as the piston rod extends. The slack adjuster has a control gear coupled to the cam shaft such that the control gear rotates as the cam shaft is rotated; a pinion gear that meshes with the control gear such that the pinion gear rotates as the control gear rotates; and a magnet coupled to the pinion gear and configured to rotate as the pinion gear rotates. A sensor is configured to sense rotation of the magnet, and an indicator is configured to indicate brake stroke of the piston rod. The cam shaft has a cam shaft axis and the pinion gear has a pinion axis that is parallel to the cam shaft axis. The magnet is coupled axially along the pinion axis.

What is claimed is:

1. A vehicle braking system having a rotatable cam shaft, a brake chamber, and a piston rod that extends from the brake chamber, the vehicle braking system comprising:
    a slack adjuster coupled to the piston rod and to the cam shaft, the slack adjuster being configured to rotate the cam shaft as the piston rod extends from the brake chamber, the slack adjuster having a control gear coupled to the cam shaft such that the control gear rotates as the cam shaft rotates;
    an indicator configured to indicate a brake stroke of the piston rod based upon rotation of the control gear; and
    a sensor and a magnet configured to rotate as the control gear rotates, and wherein the sensor is configured to sense rotation of the control gear based upon rotation of the magnet;
    wherein the slack adjuster further comprises a pinion gear that is coupled to the control gear such that rotation of the control gear causes rotation of the pinion gear.

2. The vehicle braking system according to claim 1, wherein the magnet is coupled to the pinion gear.

3. The vehicle braking system according to claim 2, further comprising a cover plate that covers the pinion gear and magnet, and wherein the sensor is coupled to the cover plate.

4. The vehicle braking system according to claim 3, wherein the slack adjuster has a control arm, wherein the controller has a memory that stores a length of the control arm and gear ratio values for the control gear and the pinion gear, and wherein the controller is configured to calculate the brake stroke of the piston rod based on the length of the control arm, the gear ratio values for the control gear and the pinion gear, and the rotation of the magnet sensed by the sensor.

5. The vehicle braking system according to claim 1, wherein the slack adjuster further comprises a take-off gear that is coupled to the pinion gear such that rotation of the pinion gear causes rotation of the take-off gear.

6. The vehicle braking system according to claim 5, wherein the magnet is coupled to the take-off gear such that rotation of the take-off gear causes rotation of the pinion gear.

7. The vehicle braking system according to claim 6, further comprising a cover plate that covers the pinion gear, take-off gear, and magnet, and wherein the sensor is coupled to the cover plate.

8. The vehicle braking system according to claim 7, wherein the slack adjuster has a control arm, wherein the controller has a memory that stores a length of the control arm and gear ratio values for the control gear, the pinion gear, and the take-off gear, and wherein the controller is configured to calculate the brake stroke of the piston rod based on the length of the control arm, the gear ratio values, and the rotation of the magnet sensed by the sensor.

9. A vehicle braking system having a rotatable cam shaft, a brake chamber, and a piston rod that extends from the brake chamber, the vehicle braking system comprising:
    a slack adjuster coupled to the piston rod and to the cam shaft, the slack adjuster being configured to rotate the cam shaft as the piston rod extends from the brake chamber, the slack adjuster having a control gear coupled to the cam shaft such that the control gear rotates as the cam shaft rotates;
    an indicator configured to indicate a brake stroke of the piston rod based upon rotation of the control gear;
    a sensor and a magnet configured to rotate as the control gear rotates, and wherein the sensor is configured to sense rotation of the control gear based upon rotation of the magnet; and
    a controller in communication with the sensor and configured to control the indicator to indicate the brake stroke of the piston rod, wherein the controller is configured to determine the brake stroke of the piston rod based on the rotation of the magnet sensed by the sensor.

10. The vehicle braking system according to claim 9, wherein the controller has a memory that stores a look-up table correlating rotation of the magnet to brake stroke of the piston rod; and wherein the controller is configured determine the brake stroke of the piston rod by comparing the rotation of the magnet sensed by the sensor to the look-up table.

11. The vehicle braking system according to claim 10, wherein the controller is further configured to control the indicator indicate when the brake stroke of the piston rod is equal to or greater than a maximum brake stroke value stored in the memory.

* * * * *